United States Patent
Fujii et al.

(10) Patent No.: US 9,963,045 B2
(45) Date of Patent: May 8, 2018

(54) OCCUPANT SENSING METHOD AND OCCUPANT SENSING DEVICE

(71) Applicant: Aisin Seiki Kabushiki Kaisha, Kariya-shi (JP)

(72) Inventors: Hiroyuki Fujii, Kariya (JP); Isao Honda, Chiryu (JP); Takahiro Izuno, Kariya (JP)

(73) Assignee: AISIN SEIKI KABUSHIKI KAISHA, Kariya-shi (JP)

( * ) Notice: Subject to any disclaimer, the term of this patent is extended or adjusted under 35 U.S.C. 154(b) by 0 days. days.

(21) Appl. No.: 15/236,567

(22) Filed: Aug. 15, 2016

(65) Prior Publication Data

US 2017/0050537 A1  Feb. 23, 2017

(30) Foreign Application Priority Data

Aug. 21, 2015  (JP) .................. 2015-164227

(51) Int. Cl.
   *B60R 21/015*  (2006.01)
   *B60N 2/00*  (2006.01)
   *B60N 2/26*  (2006.01)

(52) U.S. Cl.
   CPC .............. *B60N 2/002* (2013.01); *B60N 2/26* (2013.01)

(58) Field of Classification Search
   CPC ............................ B60R 21/01556; B60N 2/002
   USPC ........................................................... 340/457
   See application file for complete search history.

(56) References Cited

U.S. PATENT DOCUMENTS

| | | | |
|---|---|---|---|
| 2002/0024257 A1* | 2/2002 | Fujimoto | B60R 21/01516 307/10.1 |
| 2003/0033065 A1* | 2/2003 | Vos | B60R 21/01516 701/45 |
| 2017/0043783 A1* | 2/2017 | Shaw | B60H 1/00978 |

FOREIGN PATENT DOCUMENTS

| | | |
|---|---|---|
| JP | 2001-354056 | 12/2001 |
| JP | 2012-188035 | 10/2012 |

* cited by examiner

*Primary Examiner* — Kevin Kim
(74) *Attorney, Agent, or Firm* — Oblon, McClelland, Maier & Neustadt, L.L.P.

(57) ABSTRACT

An occupant sensing method includes steps of: sensing installation of a child seat on a seat of a vehicle; storing a detection value of a load sensor which is provided to be attached to the seat and detects an input load as a first load value, when the installation of the child seat is sensed; storing a detection value of the load sensor as a second load value when a predetermined time period has elapsed from a time point at which the installation of the child seat is sensed; and estimating a load change amount at the time of getting on/off which is a change amount of a load that is generated as the occupant gets on/off the child seat, based on a difference value between the first load value and the second load value.

18 Claims, 9 Drawing Sheets

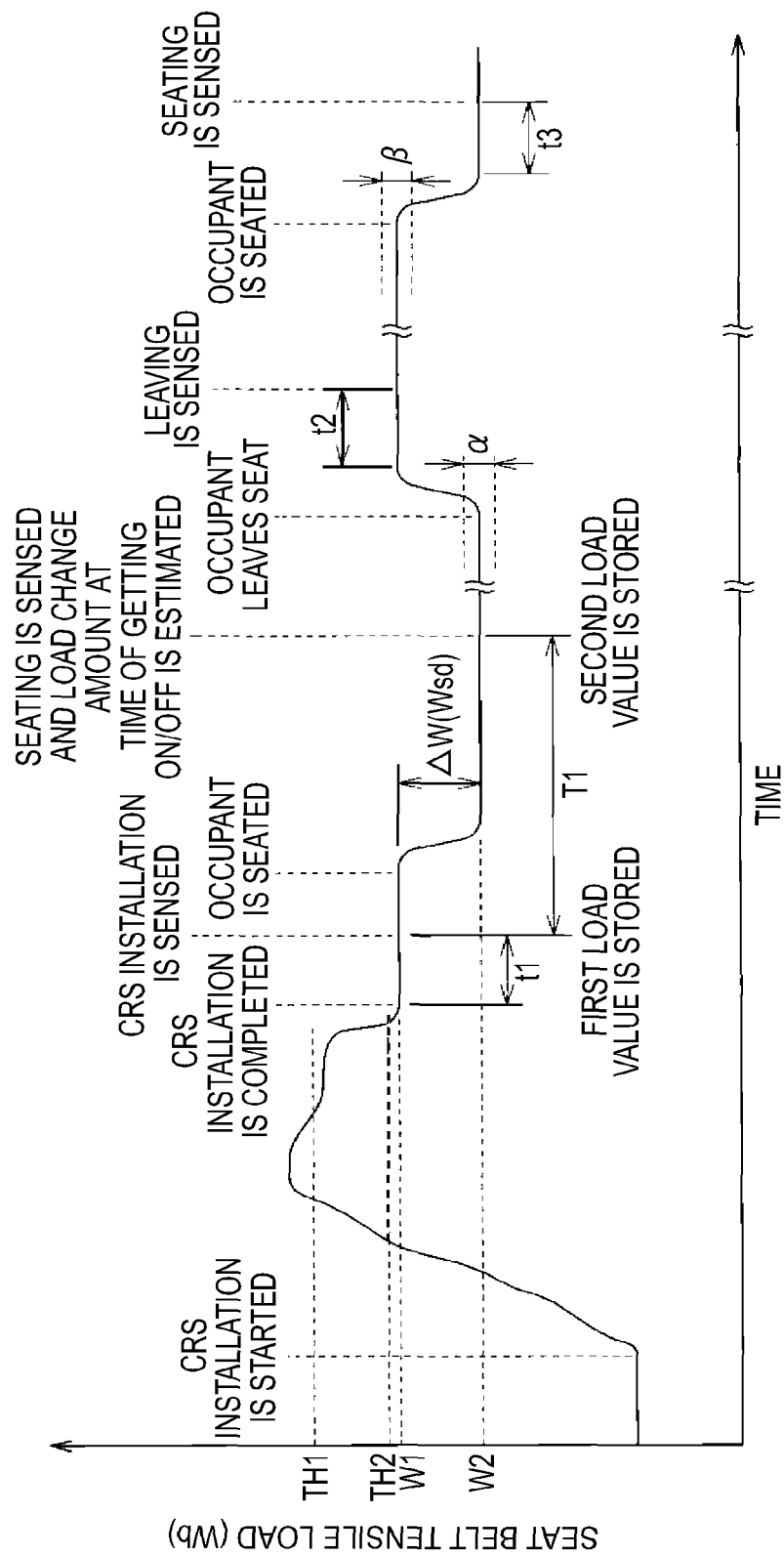

OCCUPANT SENSING METHOD AND OCCUPANT SENSING DEVICE

CROSS REFERENCE TO RELATED APPLICATIONS

This application is based on and claims priority under 35 U.S.C. § 119 to Japanese Patent Application 2015-164227, filed on Aug. 21, 2015, the entire contents of which are incorporated herein by reference.

TECHNICAL FIELD

This disclosure relates to an occupant sensing method and an occupant sensing device.

BACKGROUND DISCUSSION

In the related art, as a method of sensing an occupant (child) of a child seat installed on a seat of a vehicle, for example, as described in JP 2012-188035A (Reference 1), a method of determining whether or not a child seat belt provided in the child seat is in an installed state, is known. In addition, in Reference 1, a configuration in which it is determined whether or not the occupant who is seated on the child seat is left in the vehicle, and in a case where it is determined that the occupant is in a left state, a warning output is performed, is disclosed.

However, in order to determine whether or not the child seat belt is in an installed state, a condition that a function of detecting the installed state is provided in the child seat in advance becomes a prerequisite. Furthermore, a situation which can be assumed from the fact that the child seat belt is in an installed state, simply, does not exceed a range in which a possibility that the occupant is seated in the child seat is high. Therefore, in the above-described technology in the related art, since there is a problem that a situation in which occupant sensing of the child seat can be used is restricted, regarding this point of view, there is room for improvement.

SUMMARY

Thus, a need exists for an occupant sensing method and an occupant sensing device which are not suspectable to the drawback mentioned above.

It is preferable that an occupant sensing method according to an aspect of the disclosure includes steps of: sensing installation of a child seat on a seat of a vehicle; storing a detection value of a load sensor which is provided to be attached to the seat and detects an input load as a first load value, when the installation of the child seat is sensed; storing a detection value of the load sensor as a second load value when a predetermined time period has elapsed from a time point at which the installation of the child seat is sensed; and estimating a load change amount at the time of getting on/off which is a change amount of a load that is generated as the occupant gets on/off the child seat, based on a difference value between the first load value and the second load value.

It is preferable that an occupant sensing device according to another aspect of this disclosure includes: an installation sensing portion which senses installation of a child seat on a seat of a vehicle; a first storage portion which stores a detection value of a load sensor which is provided to be attached to the seat and detects an input load as a first load value, when the installation of the child seat is sensed; a second storage portion which stores a detection value of the load sensor as a second load value when a predetermined time period has elapsed from a time point at which the installation of the child seat is sensed; and a load change amount at the time of getting on/off estimating portion which estimates a load change amount at the time of getting on/off which is a change amount of a load that is generated as the occupant gets on/off the child seat, based on a difference value between the first load value and the second load value.

BRIEF DESCRIPTION OF THE DRAWINGS

The foregoing and additional features and characteristics of this disclosure will become more apparent from the following detailed description considered with the reference to the accompanying drawings, wherein:

FIG. 9 is a view illustrating a tensile load of a seat belt which changes as the child seat is installed on the seat and the occupant (child) gets on/off the child seat.

DETAILED DESCRIPTION

First Embodiment

Hereinafter, a first embodiment of an occupant sensing device installed on a vehicular seat will be described with reference to the drawings.

Figure 1:
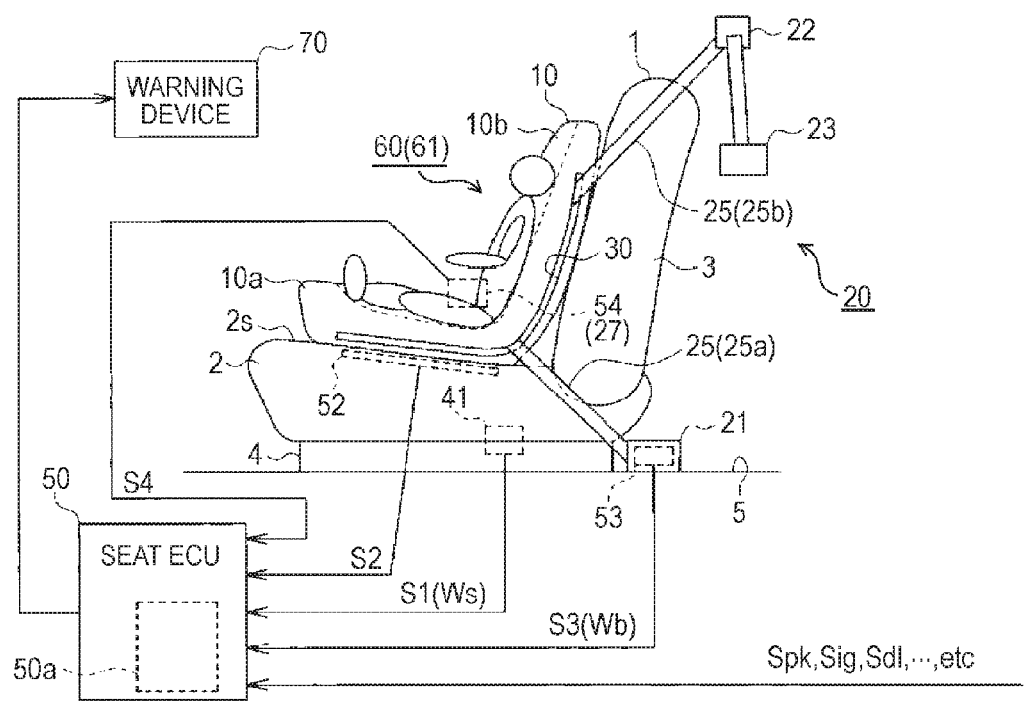
FIG. 1 is a schematic configuration view (side view) of a seat which has a child seat installed thereon, a seat belt device, and an occupant sensing device.
Figure 2:
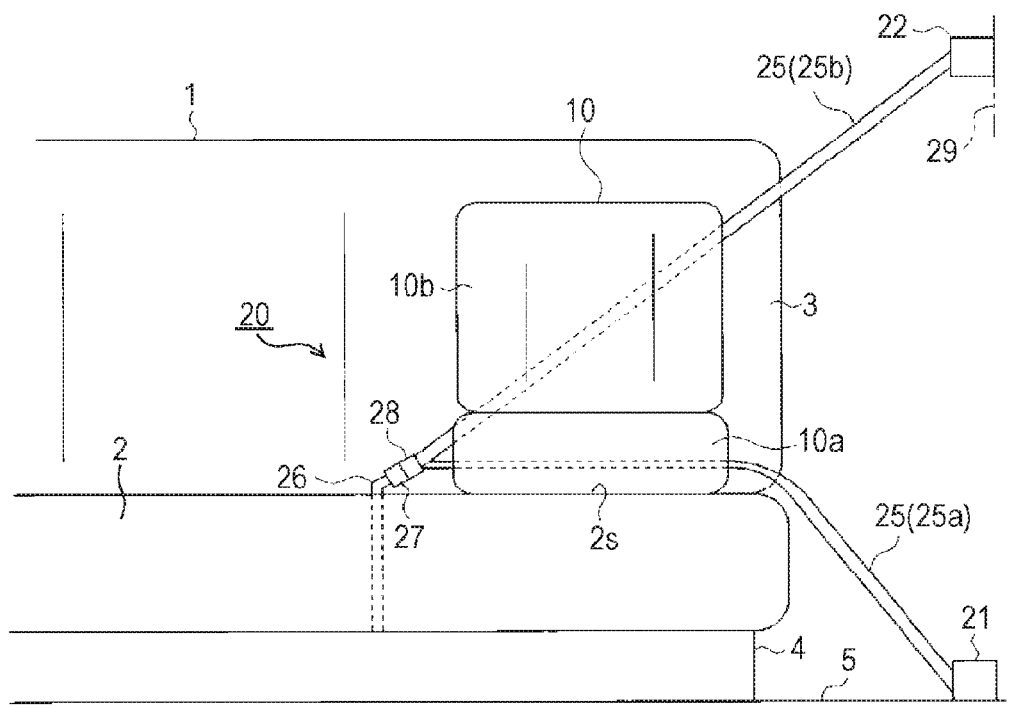
FIG. 2 is a front view schematically illustrating the seat which has the child seat installed thereon and the seat belt device.

As illustrated in FIGS. 1 and 2, a vehicular seat 1 includes a seat cushion 2 and a seatback 3 provided in a rear end portion of the seat cushion 2. Specifically, the seat 1 of the embodiment configures a so-called bench seat type rear seat. In addition, in a vehicle of the embodiment, the seat 1 is fixed to a floor portion 5 of the vehicle via a support member 4, such as a slide rail or a bracket. In addition, in each drawing, a child seat (CRS) 10 installed on the seat 1 is illustrated.

Specifically, in the vehicle of the embodiment, a seat belt device 20 attached to the seat 1 has a seat belt 25 in which one end side is locked to an outer lap anchor 21 and the other end side is connected to a belt retractor 23 via a through-type shoulder anchor 22. In addition, in the middle of the seat belt 25, a tongue plate 28 which is engaged to be attachable to and detachable from a buckle 27 provided in an inner lap anchor 26 is provided. Furthermore, in the embodiment, the outer lap anchor 21 and the shoulder anchor 22 are fixed to a vehicle body (the floor portion 5 and a side wall portion 29 thereof), and the inner lap anchor 26 is fixed to the support member 4 of the seat 1. In addition, accordingly, the seat belt device 20 of the embodiment has a configuration as a so-called three-point type seat belt device in which each of the seat belt anchors (21, 22, 26) provided at three locations is used as a support point.

In addition, in the seat belt device 20 of the embodiment, in a case where the seat belt 25 is stopped in the middle of being drawn out, the belt retractor 23 is configured to regulate an operation of the seat belt 25 in the drawing direction at the position, and to allow only an operation in the winding direction. In addition, the child seat 10 of the embodiment is configured to be fixed onto the seat 1 by using an "automatic locking retractor (ALR) function" installed in the seat belt device 20.

More specifically, the child seat 10 of the embodiment has a belt insertion hole 30 which penetrates a seat cushion 10a and a seatback 10b in the width direction. In addition, when installing the child seat 10 on the seat 1, the seat belt 25 penetrates the belt insertion hole 30.

Specifically, at this time, a lap strap portion 25a of the seat belt 25 penetrates the seat cushion 10a part of the belt insertion hole 30, and a shoulder strap portion 25b penetrates the seatback 10b part of the belt insertion hole 30. In addition, the tongue plate 28 of the seat belt 25 drawn out of the belt insertion hole 30 is hooked to the buckle 27 provided on an inner side (inner side in the vehicle width direction) of the seat 1, similar to a case where the occupant is seated on the seat 1. In addition, the child seat 10 of the embodiment is configured to be bound onto the seat 1 as the seat belt 25 is fastened by using the above-described ALR function in this state.

Occupant Sensing Device

Next, a configuration of the occupant sensing device installed on the vehicular seat will be described.

As illustrated in FIG. 1, the seat 1 of the embodiment includes a seat load sensor 41 which detects a seat load Ws applied to a seating surface 2s thereof below the seat cushion 2. Furthermore, in the embodiment, as the seat load sensor 41, a known strain sensor provided in a seat frame (between the seat frame and the support member 4 of the seat 1) which is not illustrated and configures a frame of the seat cushion 2, is used. In addition, in the vehicle of the embodiment, a sensor output S1 of the seat load sensor 41 is input to a seat ECU 50. In addition, accordingly, the seat ECU 50 of the embodiment is configured to function as an occupant sensing device which can sense the occupant who is seated on the seat 1.

Specifically, various control signals are input to the seat ECU 50 of the embodiment together with the sensor output S1 of the above-described seat load sensor 41. Specifically, in the seat 1 of the embodiment, a pressure sensitive type seating sensor (membrane switch) 52 which becomes ON as the seat cushion 2 that configures the seating surface 2s is pushed down, is provided. In addition, in the outer lap anchor 21 which configures the seat belt device 20, a seat belt load sensor 53 which detects a tensile load Wb of the seat belt 25 is provided. Furthermore, in the buckle 27 which is engaged with the tongue plate 28 of the seat belt 25, a seat belt installation sensor 54 which senses the engaged state is provided. In addition, each of sensor outputs S2 to S4 of the seating sensor 52, the seat belt load sensor 53, and the seat belt installation sensor 54 is input to the seat ECU 50 of the embodiment.

In addition, an ignition signal Sig, a door lock signal Sdl, and a parking signal Spk which indicates that the vehicle is in a parked state, are input to the seat ECU 50 of the embodiment, in addition to the sensor outputs S1 to S4 of each sensor provided to be attached to the seat 1 as described above. In addition, the seat ECU 50 of the embodiment is configured to perform the occupant sensing determination of the seat 1 based on the seat load Ws indicated in the sensor output S1 of the above-described seat load sensor 41 and various control signals thereof.

Occupant Sensing Determination of Child Seat

Next, the occupant sensing determination of the child seat 10 which is performed by the seat ECU 50 of the embodiment will be described.

Figure 3:
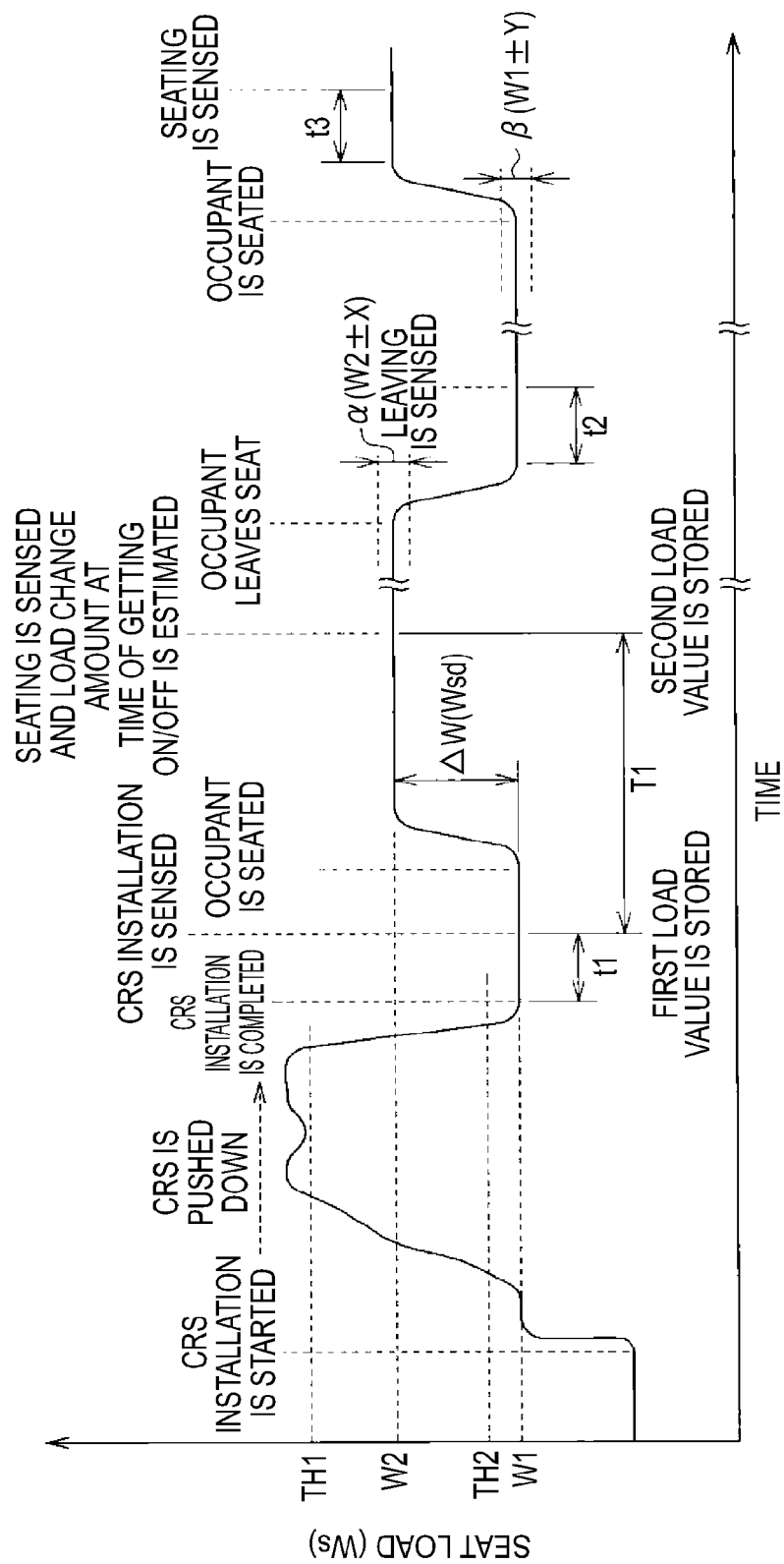
FIG. 3 is a view illustrating a seat load which changes as the child seat is installed on the seat and an occupant (child) gets on/off the child seat.

As illustrated in FIG. 3, the detection value of the seat load sensor 41 which serves as a load sensor provided to be attached to the seat 1, that is, the seat load Ws changes by installing the child seat 10 on the seat 1. In addition, the seat load Ws changes as an occupant 60 gets on/off the child seat 10, that is, a child 61 (refer to FIG. 1) is seated on and leaves the child seat 10. In addition, the seat ECU 50 of the embodiment is configured to sense the installation of the child seat 10 on the seat 1 and the occupant 60 getting on/off the child seat 10 based on a change in the seat load Ws.

Specifically, by loading the child seat 10 on the seating surface 2s of the seat 1, the detection value of the seat load sensor 41, that is, the seat load Ws increases. In addition, in general, when binding the child seat 10 by the seat belt 25, in a state where the load is applied to the child seat 10 and the child seat 10 is pushed downward, the fastening using the above-described ALR function is performed. In addition, the operation of pushing down the child seat 10 continues until the binding of the child seat 10 to the seat 1 is completed.

At this time, the seat ECU 50 of the embodiment monitors the vertical operation of the seat load Ws which is generated by the operation of pushing down the child seat 10. Specifically, the seat ECU 50 which serves as the installation determination portion determines whether or not the seat load Ws detected by the seat load sensor 41 changes in the direction which is the same as that in a case where the occupant 60 is seated on the child seat 10, that is, the increasing direction, and exceeds a predetermined first threshold value TH1. In addition, after this, the seat ECU 50 determines whether or not the seat load Ws changes in the direction which is the same as that in a case where the occupant 60 leaves the child seat 10, that is, the decreasing direction, and becomes lower than a predetermined second threshold value TH2, in a predetermined time period t0. Furthermore, the seat ECU 50 determines whether or not the seat load Ws is continuously stabilized in a predetermined time period t1. In addition, in a case where each of the conditions is satisfied, it is determined that the child seat 10 is installed on the seat 1.

Figure 4:
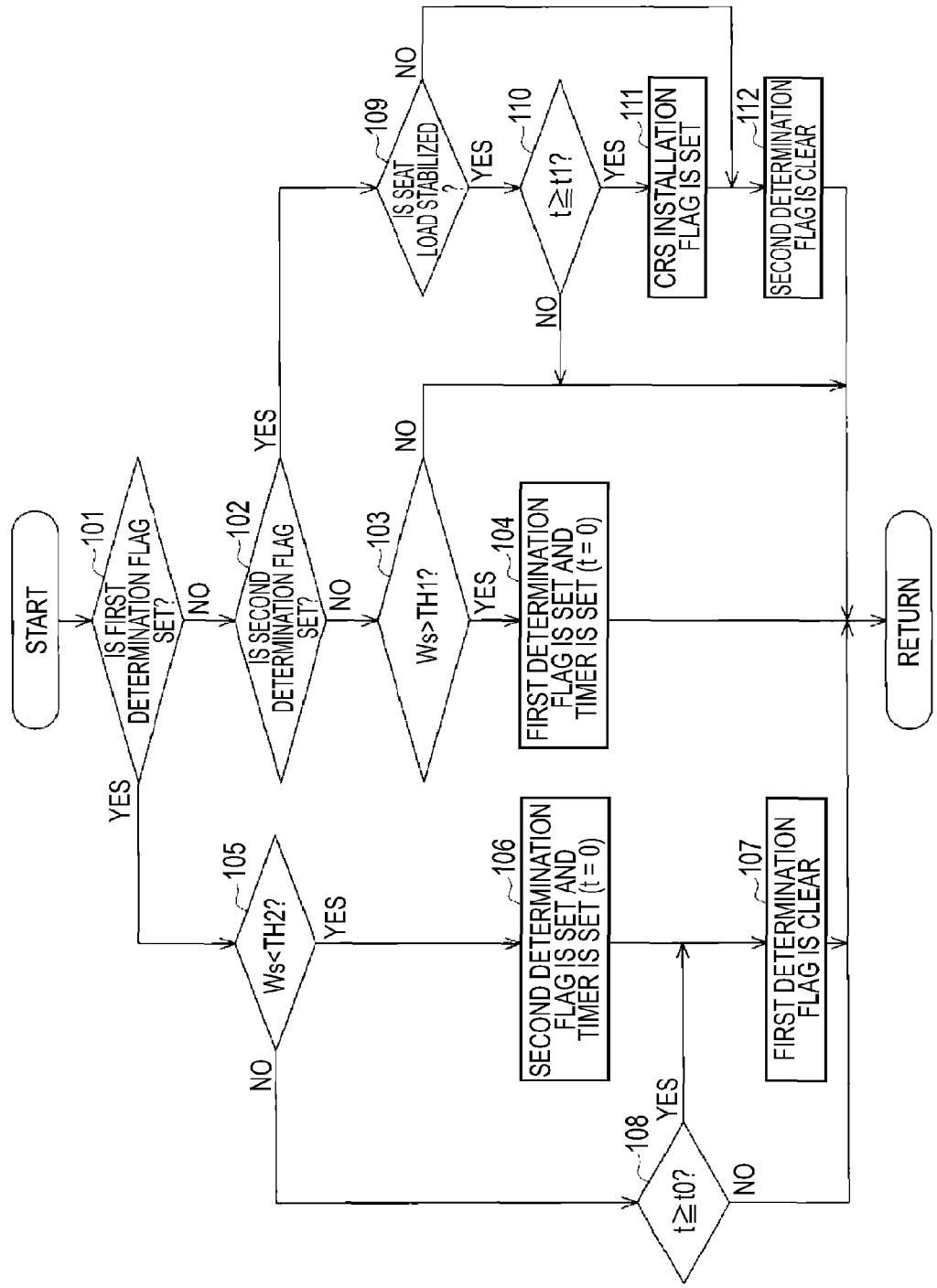
FIG. 4 is a flowchart illustrating a processing order of installation sensing determination of the child seat on the seat.

Specifically, as illustrated in a flowchart of FIG. 4, first, the seat ECU 50 of the embodiment determines whether or not a first determination flag is set (step 101), and in a case where the first determination flag is not set (step 101: NO), then, the seat ECU 50 determines whether or not a second determination flag is set (step 102). Furthermore, in step 102, in a case where the second determination flag is not set (step 102: NO), the seat ECU 50 determines whether or not the seat load Ws detected by the seat load sensor 41 exceeds the first threshold value TH1 (step 103). In addition, in a case where the seat load Ws exceeds the first threshold value TH1 (WS>TH1, step 103: YES), the first determination flag is set and a timer for measuring time period is set (step 104).

In addition, in the above-described step 101, in a case where the first determination flag is set (step 101: YES), then, the seat ECU 50 determines whether or not the seat load Ws is lower than the second threshold value TH2 (step 105). In addition, in a case where the seat load Ws is lower than the second threshold value TH2 (Ws<TH2, step 105: YES), the second determination flag is set, the timer for measuring time period is set (step 106), and the first determination flag is clear (step 107).

Meanwhile, in the above-described step 105, in a case where the seat load Ws is not lower than the second threshold value TH2 (Ws≥TH2, step 105: NO), the seat ECU 50 determines whether or not an elapsed time period t after the first determination flag is set reaches the predetermined time period t0 set in advance (step 108). In addition, in a case where the elapsed time period t, that is, the elapsed time period t after a change in the load which corresponds to a pushing load when binding the child seat 10 to the seat 1 is detected reaches the predetermined time period t0 (t≥t0, step 108: YES), the processing of the above-described step 106 is not performed, and in step 107, the first determination flag is clear.

In addition, in the above-described step 102, in a case where the second determination flag is set (step 102: YES), the seat ECU 50 determines whether or not the seat load Ws which is lower than the second threshold value TH2 is in a stabilized state (step 109). Furthermore, in the embodiment, the stabilized state determination of the seat load Ws in step 109 is performed by whether or not a change amount per one cycle is within a predetermined value (the same hereinafter). Furthermore, in a case where it is determined that the seat load Ws which is lower than the second threshold value TH2 is in a stabilized state (step 109: YES), then, the seat ECU 50 determines whether or not the elapsed time period t after the second determination flag is set reaches the predetermined time period t1 set in advance (step 110). In addition, in a case where the elapsed time period t reaches the predetermined time period t1 (t≥t1, step 110: YES), a CRS installation flag which indicates that the child seat 10 is installed on the seat 1 is set (step 111), and the second determination flag is clear (step 112).

Furthermore, in the above-described step 103, in a case where the seat load Ws is lower than the first threshold value TH1 (Ws≤TH1, step 103: NO), that is, in a case where the change in the load which corresponds to "application of the pushing load" when binding the child seat is not detected, the seat ECU 50 of the embodiment does not perform the processing of the above-described step 104. In addition, in the above-described step 108, in a case where the elapsed time period T from the time point at which the change in the load which corresponds to the "pushing load" is detected does not reach the predetermined time period t0 set in advance (t<t0, step 108: NO), the processing of step 107 is not performed.

In addition, in the above-described step 110, in a case where the elapsed time period t from the time point at which the change in the load which corresponds to "releasing of the pushing load" when the binding of the child seat 10 is completed is detected does not reach the predetermined time period t1 set in advance (t<t1, step 110: NO), the seat ECU 50 of the embodiment does not perform the processing of step 111 and step 112. In addition, in the above-described step 109, in a case where it is determined that the seat load Ws after the seat load Ws becomes lower than the second threshold value TH2 is not in a stabilized state, the processing of the above-described step 110 and step 111 is not performed, and in step 112, the second determination flag is clear.

More specifically, as illustrated in FIG. 3, when the installation of the child seat 10 on the seat 1 is detected, the seat ECU 50 of the embodiment stores the value of the seat load Ws detected at this time point as a first load value W1 in a storage region 50a (refer to FIG. 1) thereof. In addition, when a predetermined time period T1 has elapsed from the time point at which the installation of the child seat 10 is detected, the seat ECU 50 stores the value of the seat load Ws detected at this time point as a second load value W2 in the storage region 50a thereof. Furthermore, the seat ECU 50 calculates a difference value ΔW between the first load value W1 and the second load value W2 (ΔW=|W2−W1|). In addition, the seat ECU 50 of the embodiment estimates a load change amount at the time of getting on/off Wsd based on the difference value ΔW.

In other words, the seat ECU 50 of the embodiment has a function of learning a change amount of the seat load Ws generated as the occupant 60 gets on/off the child seat 10, that is, the load change amount at the time of getting on/off Wsd, by allowing the occupant 60 to be seated on the child seat 10 within the predetermined time period T1 after installing the child seat 10 on the seat 1. In addition, in a case where the installation of the child seat 10 is sensed, based on the change in the seat load Ws which corresponds to the load change amount at the time of getting on/off Wsd, the occupant 60 getting on/off the child seat 10, that is, seating on and leaving the seat, are sensed.

Figure 5:
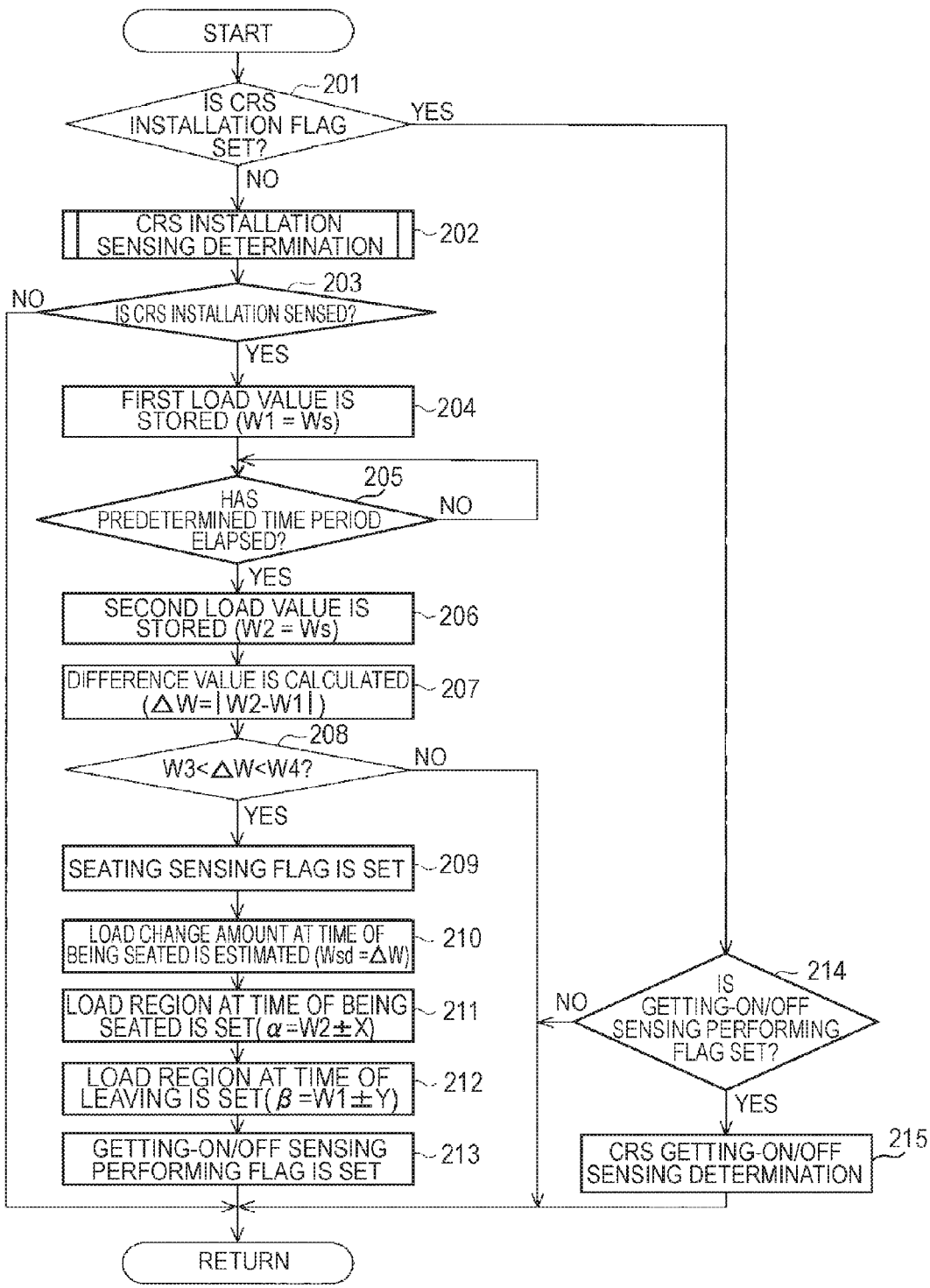
FIG. 5 is a flowchart illustrating a processing order of storing a first load value and a second load value, and estimating a load change amount at the time of getting on/off based on a difference value between the first load value and the second load value.

Specifically, as illustrated in the flowchart of FIG. 5, the seat ECU 50 of the embodiment determines whether or not the above-described CRS installation flag is set (step 201), and in a case where the CRS installation flag is not set (step 201: NO), the installation sensing determination (CRS installation sensing determination, refer to FIG. 4) of the child seat 10 is performed as described above (step 202). In addition, in the CRS installation sensing determination, in a case where the installation of the child seat 10 on the seat 1 is sensed (step 203: YES), the seat ECU 50 which serves as a first storage portion stores the value of the seat load Ws detected at this time point as the first load value W1 (step 204, W1=Ws).

Next, the seat ECU 50 determines whether or not the predetermined time period T1 from the time point at which the first load value W1 of the seat load Ws is stored has elapsed (step 205). Furthermore, after the predetermined time period T1 has elapsed (step 205: YES), the seat ECU 50 which serves as a second storage portion stores the value of the seat load Ws detected at this time point as the second load value W2 (step 206, W2=Ws). In addition, the seat ECU 50 calculates the difference value ΔW between the second load value W2 stored in step 206 and the first load value W1 stored in the above-described step 204 (ΔW=|W2−W1|, step 207).

In addition, the seat ECU 50 of the embodiment determines whether or not the difference value ΔW calculated in step 207 is within a predetermined range regulated by two threshold values W3 and W4 set in advance (step 208). In addition, in a case where it is determined that the difference value ΔW is within a predetermined range regulated by two threshold values W3 and W4 (W3<ΔW<W4, step 208: YES), a seating sensing flag which indicates that the seating of the occupant 60 on the child seat 10 is sensed is set (step 209).

Furthermore, after the seating sensing flag is set in step 209, the seat ECU 50 estimates the difference value ΔW between the first load value W1 and the second load value W2 as the load change amount at the time of getting on/off Wsd (Wsd=ΔW, step 210). In addition, the seat ECU 50 sets an increase and decrease range of a predetermined value X from the second load value W2 stored in the above-described step 206 as a load region at the time of being seated α (α=W2±X, step 211), and sets an increase and decrease range of a predetermined value Y from the first load value W1 stored in the above-described step 204 as a load region at the time of leaving β (β=W1±Y, step 212). In addition, a getting-on/off sensing performing flag which indicates that the getting-on/off sensing determination of the occupant 60 with respect to the child seat 10 is supposed to be performed is set (step 213).

Furthermore, in the above-described step 208, in a case where the difference value ΔW between the first load value W1 and the second load value W2 is not within the predetermined range regulated by two threshold values W3 and W4 (step 208: NO), the seat ECU 50 of the embodiment does not perform the processing of the above-described step 209 to step 213. In addition, in the above-described step 203, in a case where the installation of the child seat 10 on the seat 1 is not sensed (step 203: NO), the processing of the above-described step 204 to step 213 is not performed.

In addition, in the above-described step 201, in a case where it is determined that the CRS installation flag is set (step 201: YES), then, the seat ECU 50 of the embodiment determines whether or not a getting-on/off sensing flag is set (step 214). In addition, in step 214, in a case where it is determined that the getting-on/off sensing flag is set (step 214: YES), the getting-on/off sensing determination of the occupant 60 with respect to the child seat 10 is performed using the estimated load change amount at the time of getting on/off Wsd, the load region at the time of being seated α, and the load region at the time of leaving β (step 215).

Furthermore, in the above-described step 214, in a case where the seat ECU 50 of the embodiment determines that the getting-on/off sensing flag is not set (step 214: NO), the getting-on/off sensing determination of step 215 is not performed. In addition, in the embodiment, accordingly, until the child seat 10 is removed from and reinstalled on the seat 1, the processing of the above-described step 202 to step 213 and step 215 is not performed.

Figure 6:
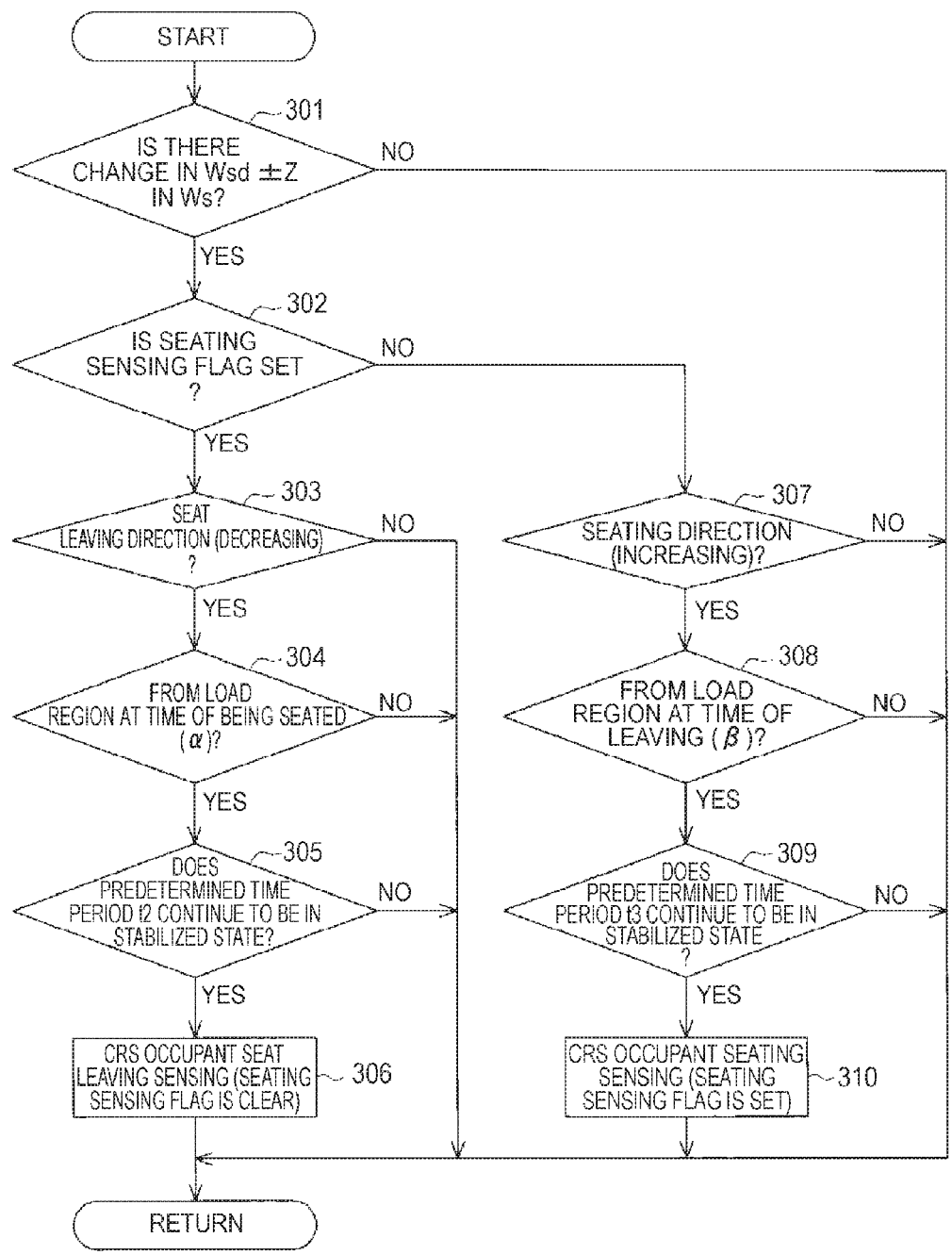
FIG. 6 is a flowchart illustrating a processing order of occupant getting-on/off sensing determination with respect to the child seat.

More specifically, as illustrated in the flowchart of FIG. 6, first, as the getting-on/off sensing determination (refer to FIG. 5, step 215), the seat ECU 50 of the embodiment determines whether or not a change which corresponds to the above-described load change amount at the time of getting on/off Wsd is generated regarding the seat load Ws detected by the seat load sensor 41 (step 301). Specifically, considering an increase and decrease range of a predetermined value Z from the load change amount at the time of getting on/off Wsd as a corresponding amount (Wsd±Z), it is determined whether or not a change in the corresponding amount is generated in the seat load Ws. In addition, in step 301, in a case where it is determined that the change which corresponds to the above-described load change amount at the time of getting on/off Wsd is generated in the seat load Ws (step 301: YES), it is determined whether or not the seating sensing flag is set (step 302).

Next, in the above-described step 302, in a case where it is determined that the seating sensing flag is set (step 302: YES), then, the seat ECU 50 determines whether or not the change generated in the seat load Ws is a change in the decreasing direction, that is, the seat leaving direction (step 303). In addition, in a case where it is determined that the changing direction of the seat load Ws is the seat leaving direction (step 303: YES), it is determined whether or not the change which corresponds to the load change amount at the time of getting on/off Wsd generated in the seat load Ws is generated from the state where the seat load Ws is in the load region at the time of being seated α (step 304).

In other words, in step 304, the seat ECU 50 of the embodiment determines whether or not the change in the seat load Ws is generated from a range of "W2±X" considering the above-described second load value W2 as a reference (refer to FIG. 3). Furthermore, in a case where the change in the seat load Ws which corresponds to the load change amount at the time of getting on/off Wsd is generated from the load region at the time of being seated α (step 304: YES), the seat ECU 50 determines whether or not the seat load Ws after the change continues to be in a stabilized state in a predetermined time period t2 (step 305). In addition, in a case where it is determined that the seat load Ws after the change continues to be in a stabilized state (step 305: YES), the seat ECU 50 of the embodiment determines that the occupant 60 left the child seat 10 and the seating sensing flag is clear (CRS occupant seat leaving sensing, step 306).

In addition, in the above-described step 302, in a case where it is determined that the seating sensing flag is not set (step 302: NO), then, the seat ECU 50 of the embodiment determines whether or not the change generated in the seat load Ws is a change in the increasing direction, that is, the seating direction (step 307). In addition, in a case where it is determined that the change generated in the seat load Ws is a change in the seating direction (step 307: YES), then, it is determined whether or not the change generated in the seat load Ws is generated from a state where the seat load Ws is in the load region at the time of leaving β (step 308).

In other words, in step 308, the seat ECU 50 of the embodiment determines whether or not the change in the seat load Ws is generated from a range of "W1±Y" considering the above-described first load value W1 as a reference (refer to FIG. 3). Furthermore, in a case where it is determined that the change in the seat load Ws which corresponds to the load change amount at the time of getting on/off Wsd is generated from the load region at the time of leaving β (step 308: YES), the seat ECU 50 determines whether or not the seat load Ws after the change continues to be in a stabilized state in a predetermined time period t3 (step 309). In addition, in a case where it is determined that the seat load Ws after the change continues to be in a stabilized state (step 309: YES), the seat ECU 50 of the embodiment determines that the occupant 60 is seated on the child seat 10 and sets the seating sensing flag (CRS occupant seating sensing, step 310).

Furthermore, in the above-described step 305, in a case where the seat load Ws after the change does not continue to be in a stabilized state (step 305: NO), the seat ECU 50 of the embodiment does not perform the processing of step 306. In addition, in the above-described step 309, in a case where it is determined that the seat load Ws after the change does not continue to be in a stabilized state (step 309: NO), the processing of step 310 is also not performed.

In addition, in the above-described step 304, in a case where it is determined that the change in the seat load Ws is not generated from the load region at the time of being seated α (step 304: NO), the seat ECU 50 does not perform the processing of step 305 and step 306. In addition, in the above-described step 308, in a case where it is determined that the change in the seat load Ws is not generated from the load region at the time of leaving β (step 308: NO), the processing of step 309 and step 310 is also not performed.

Furthermore, in the above-described step 303, in a case where it is determined that the changing direction of the seat load Ws is not the seat leaving direction (step 303: NO), the seat ECU 50 does not perform the processing of step 304 to step 306. In addition, in the above-described step 307, in a case where it is determined that the changing direction of the seat load Ws is not the seat leaving direction (step 307: NO), similarly, the processing of step 308 to step 310 is not performed. In addition, in the above-described step 301, in a case where it is determined that the change which corresponds to the load change amount at the time of getting on/off Wsd is not generated in the seat load Ws (step 301: NO), the processing of step 302 to step 310 is not performed.

In addition, in a case where the installation of the child seat 10 on the seat 1 is sensed (refer to FIG. 3), based on the sensor outputs S1 to S4 of various sensors provided to be attached to the seat 1 (refer to FIG. 1), the seat ECU 50 of the embodiment performs removal sensing determination of the child seat 10.

Figure 7:
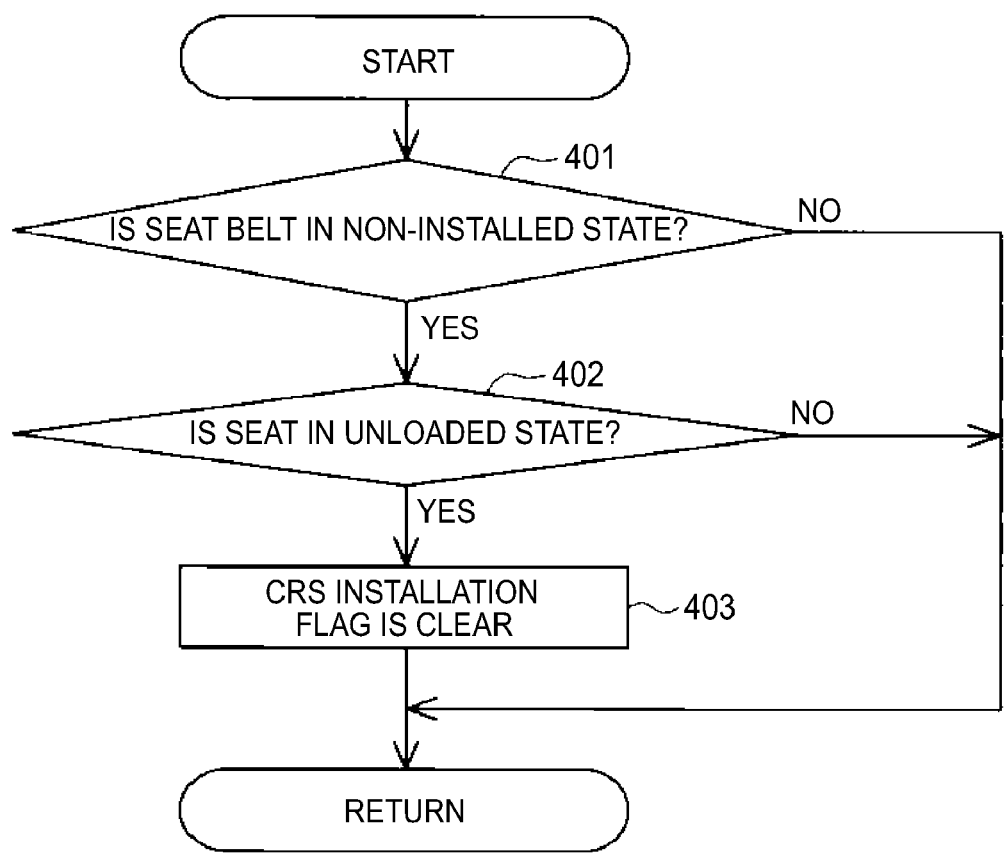
FIG. 7 is a flowchart illustrating a processing order of removal sensing determination of the child seat.

Specifically, as illustrated in a flowchart of FIG. 7, based on each of the sensor outputs S3 and S4 of the above-described seat belt load sensor 53 and the seat belt installation sensor 54, the seat ECU 50 determines whether or not the seat belt 25 is in a non-installed state, that is, whether or not the binding of the child seat 10 by the seat belt 25 is released (step 401). Furthermore, in step 401, in a case where it is determined that the seat belt 25 is in a non-installed state (step 401: YES), based on each of the sensor outputs S1 and S2 of the above-described seat load sensor 41 and the seating sensor 52, the seat ECU 50 determines whether or not the seat 1 is in an unloaded state (step 402). In addition, in step 402, in a case where it is determined that the seat 1 is in an unloaded state (step 402: YES), it is determined that the child seat 10 is removed from the seat 1, and the CRS installation flag (refer to FIG. 4, step 111), is clear.

CRS Occupant in-Vehicle Left State Sensing Determination and Warning Output

Next, the CRS occupant in-vehicle left state sensing determination and the warning output which are performed by the seat ECU 50 of the embodiment will be described.

In a case where it is sensed that the occupant 60 (child 61) is seated on the child seat 10 installed on the above-described seat 1, the seat ECU 50 of the embodiment determines whether or not the occupant 60 of the child seat 10 is in a state of being left in the vehicle (in-vehicle left, abandoned state). In addition, in a state where it is determined that the occupant 60 is in an in-vehicle left state, the warning output is performed via a warning device 70 (refer to FIG. 1, for example, including an external output device, such as a speaker or a warning lamp, or a winker or a horn) provided in the vehicle.

Figure 8:
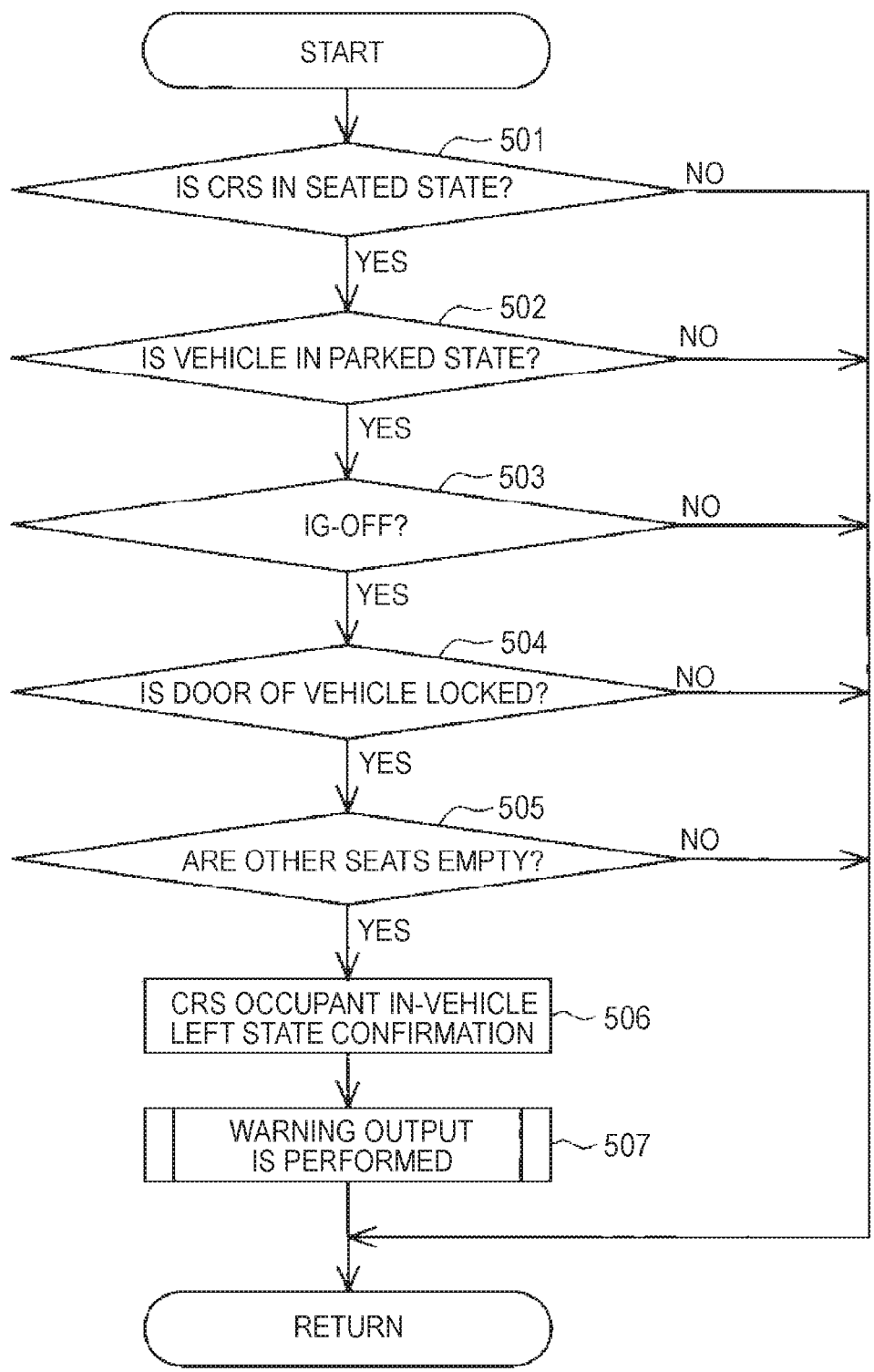
FIG. 8 is a flowchart illustrating a processing order of in-vehicle left state sensing determination with respect to the occupant who is seated on the child seat and warning output.

Specifically, as illustrated in a flowchart of FIG. 8, in a case where the seating of the occupant 60 on the child seat 10 installed on the seat 1 is sensed (step 501: YES), first, the seat ECU 50 of the embodiment determines whether or not the vehicle is in a parked state (step 502). In addition, in step 502, in a case where it is determined that the vehicle is in a parked state (step 502: YES), it is determined whether or not an ignition switch of the vehicle is OFF (step 503). In addition, in step 503, in a case where it is determined that the ignition switch of the vehicle is OFF (step 503: YES), it is determined whether or not a door of the vehicle is locked (step 504).

In addition, in the above-described step 504, in a case where it is determined that the door of the vehicle is locked (step 504: YES), then, the seat ECU 50 of the embodiment determines whether or not each seat (other seats which do not have the child seat 10 installed thereon, such as a driver's seat or passenger seat) other than the child seat 10 is empty (step 505). In addition, in a case where it is determined each of the other seats is empty (step 505: YES), it is determined that the occupant 60 of the child seat 10 is left in the vehicle (CRS occupant in-vehicle left state confirmation, step 506), and the warning output via the above-described warning device 70 is performed (step 507).

Above, according to the embodiment, the following effects can be obtained.

(1) The seat ECU 50 which serves as the occupant sensing device stores the seat load Ws when the installation of the child seat 10 on the seat 1 is sensed as the first load value W1. In addition, the seat ECU 50 stores the seat load Ws when the predetermined time period T1 has elapsed after the time point at which the installation of the child seat 10 is sensed as the second load value W2. Furthermore, based on the difference value ΔW between the first load value W1 and the second load value W2, the seat ECU 50 estimates the load change amount at the time of getting on/off Wsd generated as the occupant 60 (child 61) gets on/off the child seat 10. In addition, based on the load change amount at the time of getting on/off Wsd, the seat ECU 50 performs the getting-on/off sensing determination of the occupant 60 with respect to the child seat 10.

According to the above-described configuration, after installing the child seat 10 on the seat 1, only by allowing the occupant 60 to be seated on the child seat 10, it is possible to learn the change amount of the seat load Ws generated as the occupant 60 gets on/off the child seat 10, that is, the load change amount at the time of getting on/off Wsd. As a result, regardless of the specifications of the child seat 10, based on the detection value of the seat load sensor 41 which serves as a load sensor provided to be attached to the seat 1, that is, the seat load Ws, it is possible to perform the getting-on/off sensing determination of the occupant 60 with respect to the child seat 10. In addition, the first load value W1, the second load value W2, and the estimated load change amount at the time of getting on/off Wsd have a correlation with the physical attributes (weight or physique) of the occupant 60 who is seated on the child seat 10 and the size (weight) of the child seat 10. Accordingly, in various situations, it is possible to use the occupant sensing of the child seat 10 installed on the seat 1.

(2) The seat ECU 50 which serves as the getting-on/off sensing portion determines that the occupant 60 left the child seat 10 on a condition that the change in the seat leaving direction (decreasing direction) which corresponds to the load change amount at the time of getting on/off Wsd is generated with respect to the seat load Ws, from the state where the seat load Ws is in the predetermined load region at the time of being seated cc which is set by using the second load value W2 as a reference. Accordingly, it is possible to more accurately sense the leaving of the occupant 60 who is seated on the child seat 10.

(3) The seat ECU 50 determines that the occupant 60 is seated on the child seat 10 on a condition that the change in the seating direction (increasing direction) which corresponds to the load change amount at the time of getting on/off Wsd is generated with respect to the seat load Ws, from the state where the seat load Ws is in the predetermined load region at the time of leaving β which is set by using the first load value W1 as a reference. Accordingly, it is possible to more accurately sense the seating of the occupant 60 on the child seat 10.

(4) In a case where the seating of the occupant 60 on the child seat 10 is sensed, and in a case where the occupant 60 is left in the vehicle, the seat ECU 50 which serves as a left state determination portion and a warning output portion performs the warning output via the warning device 70. Accordingly, it is possible to prevent the occupant 60 who is seated on the child seat 10 from being in a left state in the vehicle.

(5) The seat ECU 50 which serves as an installation sensing portion determines whether or not the seat load Ws changes in the direction which is the same as that in a case where the occupant 60 is seated on the child seat 10, that is, the increasing direction, and exceeds the predetermined first threshold value TH1. In addition, after this, in the predetermined time period t0, the seat ECU 50 determines whether or not the seat load Ws changes in the direction which is the same as that in a case where the occupant 60 leaves the child seat 10, that is, the decreasing direction, and becomes lower than the predetermined second threshold value TH2. In addition, on a condition that each of the conditions is satisfied, the seat ECU 50 determines that the child seat 10 is installed on the seat 1.

According to the above-described configuration, regardless of the specifications of the child seat 10, based on the detection value of the seat load sensor 41 which serves as a load sensor provided to be attached to the seat 1, that is, the seat load Ws, it is possible to perform the installation sensing determination of the child seat 10 on the seat 1. Accordingly, in various situations, it is possible to use the occupant sensing with respect to the child seat 10 installed on the seat 1.

(6) The seat ECU 50 which serves as a load change amount at the time of getting on/off estimating portion estimates the difference value ΔW as the load change amount at the time of getting on/off Wsd on a condition that the difference value ΔW between the first load value W1 and the second load value W2 is in a predetermined range regulated by two threshold values W3 and W4 (W3<ΔW<W4). Accordingly, it is possible to more accurately estimate the load change amount at the time of getting on/off Wsd.

(7) After the change in the seat load Ws which corresponds to the load change amount at the time of getting on/off Wsd, the seat ECU 50 senses the seating of the occupant 60 on the child seat 10 and the leaving of the occupant 60 from the child seat 10 on a condition that the seat load Ws continues to be in a stabilized state in the predetermined time period (t2, t3). Accordingly, it is possible to more accurately perform the getting-on/off sensing determination.

Second Embodiment

Hereinafter, a second embodiment related to the occupant sensing device installed on the vehicular seat will be described with reference to the drawings. Furthermore, in order to make it easy to understand, similar configurations as those of the above-described first embodiment will be given the same reference numerals, and the description thereof will be omitted.

As illustrated in FIG. 9, the detection value of the above-described seat belt load sensor 53 which serves as a load sensor provided to be attached to the seat 1, that is, the tensile load Wb of the seat belt 25, changes as the child seat 10 is installed on the seat 1. In addition, the tensile load Wb of the seat belt 25 also changes as by allowing the occupant 60 to get on/off the child seat 10, that is, by allowing the child 61 (refer to FIG. 1) to be seated on and to leave the child seat 10. In addition, based on the change generated in the tensile load Wb of the seat belt 25, the seat ECU 50 of the embodiment is configured to sense the installation of the child seat 10 on the seat 1, and the occupant 60 getting on/off the child seat 10.

Specifically, the tensile load Wb of the seat belt 25 detected by the seat belt load sensor 53 is to bind the child seat 10 to the seat 1 by using the ALR function of the seat belt device 20, and increases by pulling the seat belt 25. In addition, the tensile load Wb decreases as the binding of the child seat 10 to the seat 1 is completed, and a force which pulls the seat belt 25 becomes loosened.

In addition, the tensile load Wb of the seat belt 25 decreases as the occupant 60 is seated on the child seat 10 and pushes down the child seat 10. In addition, the tensile load Wb increases as the occupant 60 leaves the child seat 10, and as a force which pushes down the child seat 10 decreases.

The seat ECU 50 of the embodiment monitors the change generated in the tensile load Wb of the seat belt 25. Specifically, the seat ECU 50 of the embodiment determines whether or not the tensile load Wb of the seat belt 25 detected by the seat belt load sensor 53 changes in the increasing direction, and exceeds the predetermined first threshold value TH1. In addition, after this, the seat ECU 50 determines whether or not the tensile load Wb of the seat belt 25 changes in the decreasing direction in the predetermined time period t0, and becomes lower than the predetermined second threshold value TH2. Furthermore, the seat ECU 50 determines whether or not the tensile load Wb of the seat belt 25 continues to be in a stabilized state in the predetermined time period t1. In addition, in a case where each condition is satisfied, it is determined that the child seat 10 is installed on the seat 1.

In addition, when the installation of the child seat 10 on the seat 1 is sensed, the seat ECU 50 of the embodiment stores the value of the tensile load Wb detected by the seat belt load sensor 53 at this point as the first load value W1 in the storage region 50a thereof. In addition, when the predetermined time period T1 has elapsed from the time point at which the installation of the child seat 10 is sensed, the seat ECU 50 stores the value of the tensile load Wb detected by the seat belt load sensor 53 at the time point as the second load value W2 in the storage region 50a thereof. Furthermore, the seat ECU 50 of the embodiment also estimates the load change amount at the time of getting on/off Wsd based on the difference value ΔW between the first load value W1 and the second load value W2. In addition, in a case where the installation of the child seat 10 is sensed, based on the change in the tensile load Wb of the seat belt 25 which corresponds to the load change amount at the time of getting on/off Wsd, the occupant 60 getting on/off the child seat 10, that is, the seating and leaving, are sensed.

Furthermore, the seat ECU 50 of the embodiment also performs the CRS installation sensing determination (refer to FIG. 4), stores the first load value W1 and the second load value W2, estimates the load change amount at the time of getting on/off Wsd based on the difference value ΔW (refer to FIG. 5), and performs the CRS getting-on/off sensing determination (refer to FIG. 6), in a processing order similar to that of the above-described first embodiment. However, in the embodiment, the decrease in the seat load Ws becomes the "change in the seating direction", and the increase in the seat load Ws becomes the "change in the seat leaving direction". In addition, the CRS removal sensing determination is performed (refer to FIG. 7), and the CRS occupant in-vehicle left state sensing determination and the warning output are performed (refer to FIG. 8), in a processing order similar to that of the above-described first embodiment.

Above, according to the configuration of the embodiment, effects similar to those of the above-described first embodiment can also be obtained.

In addition, each of the above-described embodiments may be changed as follows.

In each of the above-described embodiments, based on the detection value of the load sensor (the seat load sensor 41 or the seat belt load sensor 53) provided to be attached to the seat 1, the installation sensing determination of the child seat 10 with respect to the seat 1 is performed. However, not being limited thereto, the contents of the CRS installation sensing determination may be arbitrarily changed. For example, considering that the tensile load Wb of the seat belt 25 exceeds the predetermined threshold value, it may be determined that the child seat 10 is installed on the seat 1. Furthermore, if a child seat installation signal is output, the output signal may be used. In addition, the contents of the removal sensing determination of the child seat 10 may be arbitrarily changed, for example, unloaded state determination of the seat 1 may not be performed.

In each of the above-described embodiments, the child seat 10 is bound to the seat 1 by the seat belt 25 by using the ALR function of the seat belt device 20. However, not being limited thereto, for example, the type of the child seat 10 installed on the seat 1, such as a so-called ISO FIX type or the like, may be any type.

In each of the above-described embodiments, the child seat 10 is installed on the seat 1 having a configuration as a so-called bench seat type rear seat. However, not being limited thereto, the seat 1 which has the child seat 10 installed thereon, that is, the seat 1 to which the occupant sensing of the child seat 10 is performed, for example, may not be necessarily the rear seat, such as a passenger seat. In addition, the type of the seat 1 may be arbitrarily changed.

In each of the above-described embodiments, based on the estimated load change amount at the time of getting on/off Wsd, the getting-on/off sensing determination of the occupant 60 with respect to the child seat 10 is performed, but not being limited to the getting-on/off sensing determination, for example, a configuration in which the load change amount at the time of getting on/off Wsd is used in the development control of an air bag or the control of child lock, may be employed.

In the above-described first embodiment, as a load sensor provided to be attached to the seat 1, the seat load sensor 41 which detects the seat load Ws applied to the seat cushion (seating surface 2s thereof) is used. In addition, in the above-described second embodiment, the seat belt load sensor 53 which detects the tensile load Wb of the seat belt 25 is used. However, not being limited thereto, as a load sensor attached to the seat 1, both the seat load sensor 41 and the seat belt load sensor 53 may be used.

In each of the above-described embodiments, a condition that the seat load Ws changes in the seat leaving direction which corresponds to the load change amount at the time of getting on/off Wsd from the state of being in the load region at the time of being seated α, is used as a condition of the seat leaving sensing, and a condition that the seat load Ws changes in the seating direction which corresponds to the load change amount at the time of getting on/off Wsd from the state of being in the load region at the time of leaving β, is used as a condition of the seating sensing (refer to FIGS. 3 and 9). However, not being limited thereto, a condition of the change in the load region at the time of being seated α and the load region at the time of leaving β may not be a condition of the seat leaving sensing and the seating sensing with respect to the occupant 60 with respect to the child seat 10.

In addition, in each of the above-described embodiments, after the change which corresponds to the load change amount at the time of getting on/off Wsd is generated in the detection values (Ws, Wb) of the load sensors (41, 53) attached to the seat 1, a condition that the detection values continue to be in a stabilized state in the predetermined time periods (t2, t3) is considered as a condition of the seat leaving sensing and the seating sensing (refer to FIGS. 3 and 9). However, not being limited thereto, without performing the stabilized state determination, considering that the change which corresponds to the load change amount at the time of getting on/off Wsd is generated in the detection value of the load sensor, the leaving of the occupant 60 who is seated on the child seat 10 and the seating of the occupant 60 on the child seat 10 may be sensed.

In each of the above-described embodiments, on a condition that the difference value ΔW between the first load value W1 and the second load value W2 is in the predetermined range regulated by two threshold values W3 and W4 (W3<ΔW<W4), the difference value ΔW is estimated as the load change amount at the time of getting on/off Wsd. However, not being limited thereto, without performing the condition determination, the difference value ΔW may be considered as the load change amount at the time of getting on/off Wsd.

In addition, a condition that the value of the seat load Ws is in a stabilized state when the detection values (Ws, Wb) of the seat load sensors (41, 53) are stored as the second load value W2 at the time point at which the predetermined time period T1 has elapsed from the time point at which the installation of the child seat 10 is sensed, may be considered as a condition. In addition, when the detection values (Ws, Wb) of the seat load sensors (41, 53) at the time point at which the installation of the child seat 10 is sensed are stored as the first load value W1, a condition that the value of the seat load Ws is in a stabilized state may also be a condition.

In each of the above-described embodiments, the sensing determination (refer to FIG. 8) of whether or not the occupant 60 of the child seat 10 is in a state of being left in the vehicle, requires all of "whether or not the vehicle is in a parked state", "whether or not the ignition switch of the vehicle is OFF", "whether or not the door of the vehicle is locked", and "whether or not each seat other than the child seat 10 is empty" are valid. However, not being limited thereto, the contents of the in-vehicle left state detection sensing determination may be arbitrary changed except for "the seating of the occupant 60 on the child seat 10 installed on the seat 1 is sensed".

Next, a technological idea which can be grasped from the above-described embodiments is described together with the effects.

It is preferable that an occupant sensing method according to an aspect of the disclosure includes steps of: sensing installation of a child seat on a seat of a vehicle; storing a detection value of a load sensor which is provided to be attached to the seat and detects an input load as a first load value, when the installation of the child seat is sensed; storing a detection value of the load sensor as a second load value when a predetermined time period has elapsed from a time point at which the installation of the child seat is sensed; and estimating a load change amount at the time of getting on/off which is a change amount of a load that is generated as the occupant gets on/off the child seat, based on a difference value between the first load value and the second load value.

According to this configuration, after installing the child seat on the seat, only by allowing the occupant (child) to be seated on the child seat, it is possible to learn the load change amount, that is, the load change amount at the time of getting on/off, which is generated in the detection value of the load sensor as the occupant gets on/off the child seat. In addition, the first load value, the second load value, and the estimated load change amount at the time of getting on/off, have a correlation with physical attributes (weight or physique) of the occupant who is seated on the child seat and the size (weight) of the child seat. Accordingly, in various situations, it is possible to use the occupant sensing of the child seat installed on the seat.

In the occupant sensing method according to the aspect of this disclosure, it is preferable that a step of sensing the occupant getting on/off the child seat based on whether or not the change which corresponds to the load change amount at the time of getting on/off is generated in the detection value of the load sensor, in a case where the installation of the child seat is sensed, is further included.

According to this configuration, regardless of the specifications of the child seat, based on the detection value of the load sensor provided to be attached to the seat, it is possible to perform occupant getting-on/off sensing determination with respect to the child seat.

In the occupant sensing method according to the aspect of this disclosure, it is preferable that the step of sensing the occupant getting on/off the child seat includes a step of determining that the occupant left the child seat, in a case where a change in the seat leaving direction which corresponds to the load change amount at the time of getting on/off is generated, from a state where the detection value of the load sensor is in a predetermined load region at the time of being seated which is set by using the second load value as a reference.

According to this configuration, it is possible to more accurately sense leaving of the occupant who is seated on the child seat.

In the occupant sensing method according to the aspect of this disclosure, it is preferable that the step of sensing the occupant getting on/off the child seat includes a step of determining that the occupant is seated on the child seat, in a case where a change in the seating direction which corresponds to the load change amount at the time of getting on/off is generated, from a state where the detection value of the load sensor is in a predetermined load region at the time of leaving which is set by using the first load value as a reference.

According to this configuration, it is possible to more accurately sense seating of the occupant on the child seat.

In the occupant sensing method according to the aspect of this disclosure, it is preferable that a step of determining whether or not the occupant is in a left state in a vehicle, in a case where seating of the occupant on the child seat is sensed; and a step of performing a warning output in a case where it is determined that the occupant is in a left state in the vehicle, are further included.

According to this configuration, it is possible to suppress a state where the occupant who is seated on the child seat is left in the vehicle.

In the occupant sensing method according to the aspect of this disclosure, it is preferable that the detection value of the load sensor indicates a seat load applied to a seat cushion.

In the occupant sensing method according to the aspect of this disclosure, it is preferable that the detection value of the load sensor indicates a tensile load of a seat belt.

According to each of the configurations, by using the load sensor provided to be attached to most of the seat, in various types of seats, it is possible to use the occupant sensing of the child seat installed on the seat.

In the occupant sensing method according to the aspect of this disclosure, it is preferable that the step of sensing the installation of the child seat on the seat includes a step of determining whether or not the child seat is installed on the seat, based on the detection value of the load sensor.

According to this configuration, regardless of the specifications of the child seat, based on the detection value of the load sensor provided to be attached to the seat, it is possible to perform the installation sensing determination of the child seat with respect to the seat. Accordingly, in various situations, it is possible to use the occupant sensing of the child seat installed on the seat.

In the occupant sensing method according to the aspect of this disclosure, it is preferable that the step of estimating a load change amount at the time of getting on/off is performed on a condition that the difference value between the first load value and the second load value is within a predetermined range.

In the occupant sensing method according to the aspect of this disclosure, it is preferable that the step of storing the first load value and the second load value stores the first load value and the second load value on a condition that the detection value of the load sensor is continuously stabilized.

In the occupant sensing method according to the aspect of this disclosure, it is preferable that the step of sensing the occupant getting on/off the child seat senses the occupant getting on/off the child seat on a condition that the detection value of the load sensor is continuously stabilized after the change which corresponds to the load change amount at the time of getting on/off generated in the detection value of the load sensor.

It is preferable that an occupant sensing device according to another aspect of this disclosure includes: an installation sensing portion which senses installation of a child seat on a seat of a vehicle; a first storage portion which stores a detection value of a load sensor which is provided to be attached to the seat and detects an input load as a first load value, when the installation of the child seat is sensed; a second storage portion which stores a detection value of the load sensor as a second load value when a predetermined time period has elapsed from a time point at which the installation of the child seat is sensed; and a load change amount at the time of getting on/off estimating portion which estimates a load change amount at the time of getting on/off which is a change amount of a load that is generated as the occupant gets on/off the child seat, based on a difference value between the first load value and the second load value.

In the occupant sensing device according to this aspect of this disclosure, it is preferable that a getting-on/off sensing portion which senses the occupant getting on/off the child seat based on whether or not the change which corresponds to the load change amount at the time of getting on/off is generated in the detection value of the load sensor, in a case where the installation of the child seat is sensed, is further included.

In the occupant sensing device according to this aspect of this disclosure, it is preferable that a left state determination portion which determines whether or not the occupant is in a left state in a vehicle, in a case where seating of the occupant on the child seat is sensed; and a warning output portion which performs a warning output in a case where it is determined that the occupant is in a left state in the vehicle, are further included.

In the occupant sensing device according to this aspect of this disclosure, it is preferable that the getting-on/off sensing portion determines that the occupant left the child seat on a condition that a change in the seat leaving direction which corresponds to the load change amount at the time of getting on/off is generated, from a state where the detection value of the load sensor is in a predetermined load region at the time of being seated which is set by using the second load value as a reference.

In the occupant sensing device according to this aspect of this disclosure, it is preferable that the getting-on/off sensing portion determines that the occupant is seated on the child seat on a condition that a change in the seating direction which corresponds to the load change amount at the time of getting on/off is generated, from a state where the detection value of the load sensor is in a predetermined load region at the time of leaving which is set by using the first load value as a reference.

According to the aspects of this disclosure, in various situations, it is possible to use the occupant sensing of the child seat installed on the seat.

The principles, preferred embodiment and mode of operation of the present invention have been described in the foregoing specification. However, the invention which is intended to be protected is not to be construed as limited to the particular embodiments disclosed. Further, the embodiments described herein are to be regarded as illustrative rather than restrictive. Variations and changes may be made by others, and equivalents employed, without departing from the spirit of the present invention. Accordingly, it is expressly intended that all such variations, changes and equivalents which fall within the spirit and scope of the present invention as defined in the claims, be embraced thereby.

What is claimed is:

1. An occupant sensing method comprising:
   determining whether or not a child seat is installed on a seat of a vehicle;
   storing a detection value of a load sensor which is provided to be attached to the seat and detects an input load as a first load value when the installation of the child seat is determined;
   storing a detection value of the load sensor as a second load value when a predetermined time period has elapsed from a time point at which the installation of the child seat is determined; and
   estimating a load change amount which is a change amount of a load that is generated as the occupant gets on/off the child seat based on a difference value between the first load value and the second load value.

2. The occupant sensing method according to claim 1, further comprising:
   sensing the occupant getting on/off the child seat based on whether or not the change which corresponds to the load change amount is generated in the detection value of the load sensor in case where the installation of the child seat is sensed.

3. The occupant sensing method according to claim 2, wherein the sensing the occupant getting on/off the child seat includes determining that the occupant left the child seat in case where the detection value of the load decreases by the amount which corresponds to the load change amount from a predetermined load region at the time of being seated and being set by using the second load value.

4. The occupant sensing method according to claim 2, wherein the sensing the occupant getting on/off the child seat includes determining that the occupant is seated on the child seat in case where the detection value of the load increases by the amount which corresponds to the load change amount from a predetermined load region at the time of leaving and being set by using the first load value.

5. The occupant sensing method according to claim 2, further comprising:
   determining whether or not the occupant is in an abandoned state in a vehicle, in a case where seating of the occupant on the child seat is sensed; and
   performing a warning output in a case where it is determined that the occupant is in the abandoned state in the vehicle.

6. The occupant sensing method according to claim 1, wherein the detection value of the load sensor indicates a seat load applied to a seat cushion.

7. The occupant sensing method according to claim 1, wherein the sensing the installation of the child seat on the seat includes determining whether or not the child seat is installed on the seat, based on the detection value of the load sensor.

8. The occupant sensing method according to claim 1, wherein the estimating a load change amount is performed on a condition that the difference value between the first load value and the second load value is within a predetermined range.

9. The occupant sensing method according to claim 1, wherein the storing the first load value and the second load value stores the first load value and the second load value on a condition that the detection value of the load sensor is continuously stabilized.

10. The occupant sensing method according to claim 6, wherein the sensing the occupant getting on/off the child seat senses the occupant getting on/off the child seat on a condition that the detection value of the load sensor is continuously stabilized after the change which corresponds to the load change amount generated in the detection value of the load sensor.

11. An occupant sensing device comprising:
    an installation sensing portion which determines whether or not a child seat is installed on a seat of a vehicle;
    a first storage portion which stores a detection value of a load sensor which is provided to be attached to the seat and detects an input load as a first load value, when the installation of the child seat is determined;
    a second storage portion which stores a detection value of the load sensor as a second load value when a predetermined time period has elapsed from a time point at which the installation of the child seat is determined; and
    a load change amount estimating portion which estimates a load change amount which is a change amount of a load that is generated as the occupant gets on/off the child seat, based on a difference value between the first load value and the second load value.

12. The occupant sensing device according to claim 11, further comprising:
a getting-on/off sensing portion which senses the occupant getting on/off the child seat based on whether or not the change which corresponds to the load change amount is generated in the detection value of the load sensor, in a case where the installation of the child seat is sensed.

13. The occupant sensing device according to claim 11, further comprising:
a left state determination portion which determines whether or not the occupant is in an abandoned state in a vehicle, in a case where seating of the occupant on the child seat is sensed; and
a warning output portion which performs a warning output in a case where it is determined that the occupant is in the abandoned state in the vehicle.

14. The occupant sensing device according to claim 12, wherein the getting-on/off sensing portion determines that the occupant left the child seat on a condition that the detection value of the load decreases by the amount which corresponds to the load change amount from a predetermined load region at the time of being seated and being set by using the second load value.

15. The occupant sensing device according to claim 12, wherein the getting-on/off sensing portion determines that the occupant is seated on the child seat on a condition that the detection value of the load increases by the amount which corresponds to the load change amount from a predetermined load region at the time of leaving and being set by using the first load value.

16. An occupant sensing method comprising:
determining whether or not a child seat is installed on a seat of a vehicle;
storing a detection value of a load sensor which is provided to be attached to the seat and detects an input load as a first load value, when the installation of the child seat is determined;
storing a detection value of the load sensor as a second load value when a predetermined time period has elapsed from a time point at which the installation of the child seat is determined; and
estimating a load change amount which is a change amount of a load that is generated as the occupant gets on/off the child seat, based on a difference value between the first load value and the second load value,
wherein the detection value of the load sensor indicates a tensile load of a seat belt.

17. The occupant sensing method according to claim 16, further comprising:
sensing the occupant getting on/off the child seat based on Whether or not the change which corresponds to the load change amount is generated in the detection value of the load sensor in case where the installation of the child seat is sensed.

18. The occupant sensing method according to claim 17, wherein the sensing the occupant getting on/off the child seat includes determining that the occupant left the child seat in case where the detection value of the load decreases by the amount which corresponds to the load change amount, the load change amount being generated from a predetermined load region at the time of being seated and being set by using the second load value.

* * * * *